(12) United States Patent
Schroeder

(10) Patent No.: US 11,585,361 B2
(45) Date of Patent: Feb. 21, 2023

(54) RECESSED-KEY PANEL INTERLOCKING DEVICE

(71) Applicant: John Harold Schroeder, Eagle Point, OR (US)

(72) Inventor: John Harold Schroeder, Eagle Point, OR (US)

( * ) Notice: Subject to any disclaimer, the term of this patent is extended or adjusted under 35 U.S.C. 154(b) by 0 days.

(21) Appl. No.: 17/722,221

(22) Filed: Apr. 15, 2022

(65) Prior Publication Data

US 2022/0364586 A1 Nov. 17, 2022

Related U.S. Application Data

(60) Provisional application No. 63/187,206, filed on May 11, 2021.

(51) Int. Cl.
*F16B 5/00* (2006.01)
*F16B 12/22* (2006.01)

(52) U.S. Cl.
CPC .............. *F16B 12/22* (2013.01); *F16B 5/002* (2013.01); *F16B 5/004* (2013.01); *F16B 5/0032* (2013.01);
(Continued)

(58) Field of Classification Search
CPC .. F16B 12/24; F16B 12/125; F16B 2012/466; F16B 5/002; F16B 5/0012; F16B 5/0032;
(Continued)

(56) References Cited

U.S. PATENT DOCUMENTS 1,952,817 A * 3/1934 Neary ..................... B65D 9/32
217/12 R
3,618,991 A * 11/1971 Edwards ............... F16B 5/0048
446/112
(Continued)

FOREIGN PATENT DOCUMENTS

AT 395 804 * 3/1993 ............. A44B 19/20
EP 2292869 A2 3/2011
(Continued)

OTHER PUBLICATIONS

50 Digital Joints, Retrieved from Internet, Retrieved on Oct. 23, 2019 <URL: https://www.flickr.com/photos/satiredun/15868308421/sizes/o/>.
(Continued)

*Primary Examiner* — Michael P Ferguson

(57) ABSTRACT

The recessed-key panel interlocking device is intended to provide a mechanical joint that can connect two panels using a single fastening key. Accordingly, the device connects two panels by interlocking uniform gaps and fingers that have been formed on the edges of each panel, by a small cylindrical key that holds them together. To accomplish this, a channel that can hold the key is formed along the edge region of both panels when the panels are oriented normally to one another. Further, when the panels are interlocked, the key is completely recessed within the panel material. Furthermore, while the panel edges that form the joint must be uniformly rectilinear and meet at right angles at the joint itself, beyond the joint they can assume any shape and bend to any angle, so that parts joined by the joint do not have to be panel-shaped or perpendicular to each other overall.

7 Claims, 10 Drawing Sheets

(52) U.S. Cl.
CPC ....... *F16B 5/0044* (2013.01); *Y10T 403/7045* (2015.01)

(58) Field of Classification Search
CPC ...... F16B 5/004; F16B 5/0044; F16B 5/0048; F16B 5/0052; F16B 5/0084; F16B 5/0092; Y10T 403/7045
See application file for complete search history.

(56) References Cited

U.S. PATENT DOCUMENTS

| | | | | |
|---|---|---|---|---|
| 3,836,217 A | * | 9/1974 | Shiina | A47B 47/0041 403/231 |
| 3,926,529 A | * | 12/1975 | Brooks | F16B 12/24 52/285.4 |
| 4,266,670 A | * | 5/1981 | Mykleby | B65D 5/445 217/65 |
| 4,930,753 A | * | 6/1990 | Alvyn | F16B 5/0048 403/339 |
| 9,370,898 B2 | * | 6/2016 | Pettigrew | F16L 23/04 |

FOREIGN PATENT DOCUMENTS

| | | | | |
|---|---|---|---|---|
| GB | 2 291 687 | * | 1/1996 | ................ F16B 5/07 |
| GB | 2 301 432 | * | 12/1996 | .............. F24F 13/06 |

OTHER PUBLICATIONS

Board Corner Joint, Retrieved from Internet, Retrieved on Oct. 23, 2019 <URL: http://amhoov.org/2019/02/14/digital-oinery-part-2-the-board-corner-joint/>.

New England Barn, Retrieved from Internet, Retrieved on Oct. 23, 2019 <URL: https://www.newenglandbarn.com/glossary.php>.

* cited by examiner

RECESSED-KEY PANEL INTERLOCKING DEVICE

FIELD OF THE INVENTION

The present invention relates to fasteners. More specifically, the present invention is a joint fastening mechanism between two panels.

BACKGROUND OF THE INVENTION

When it comes to connection of two panels, there are hundreds of mechanically different ways to attach two panels. Many known methods are inclusive to using a plurality of fasteners such as screws and hinges. In addition, the use of numerous screws and hinges can be difficult to deal with due to the fact of simply dealing with multiple different components at one given moment.

SUMMARY

An objective of the present invention is to provide a mechanical joint utilized to connect two panels together using a single fastening key. Accordingly, the present invention is an interlocking device for connecting the edges of two panels by interlocking uniform gaps and fingers that have been formed on the edges of each panel and a small cylindrical key that holds them together. To accomplish this, a channel that can hold the key is formed along the edge region of both panels when the panels are oriented according to a desired configuration. Further, when the panels are interlocked, the key is completely recessed within the panel material. Furthermore, while the panel edges that form the joint must be uniformly rectilinear and meet at right angles at the joint itself, beyond the joint they can assume any shape and bend to any angle, so that parts joined by the joint do not have to be panel-shaped or perpendicular to each other overall. Thus, the present invention is a simple, user friendly and aesthetically appealing interlocking device that may connect different types of panels.

DETAILED DESCRIPTIONS OF THE INVENTION

All illustrations of the drawings are for the purpose of describing selected versions of the present invention and are not intended to limit the scope of the present invention.

In reference to FIG. 1 through FIG. 10, the present invention is a recessed-key interlocking device. An objective of the present invention is to provide a mechanical joint utilized to connect two panels together using a single fastening key. Accordingly, the present invention is an interlocking device for connecting the edges of two panels by interlocking uniform gaps and fingers that have been formed on the edges of each panel and a small cylindrical key that holds them together. To accomplish this, a channel that can hold the key is formed along the edge region of both panels when the panels are oriented according to a desired configuration. Further, when the panels are interlocked, the key is completely recessed within the panel material. Furthermore, while the panel edges that form the joint must be uniformly rectilinear and meet at right angles at the joint itself, beyond the joint they can assume any shape and bend to any angle, so that parts joined by the joint do not have to be panel-shaped or perpendicular to each other overall. Thus, the present invention is a simple, user friendly and aesthetically appealing interlocking device that may connect different types of panels.

Figure 3:
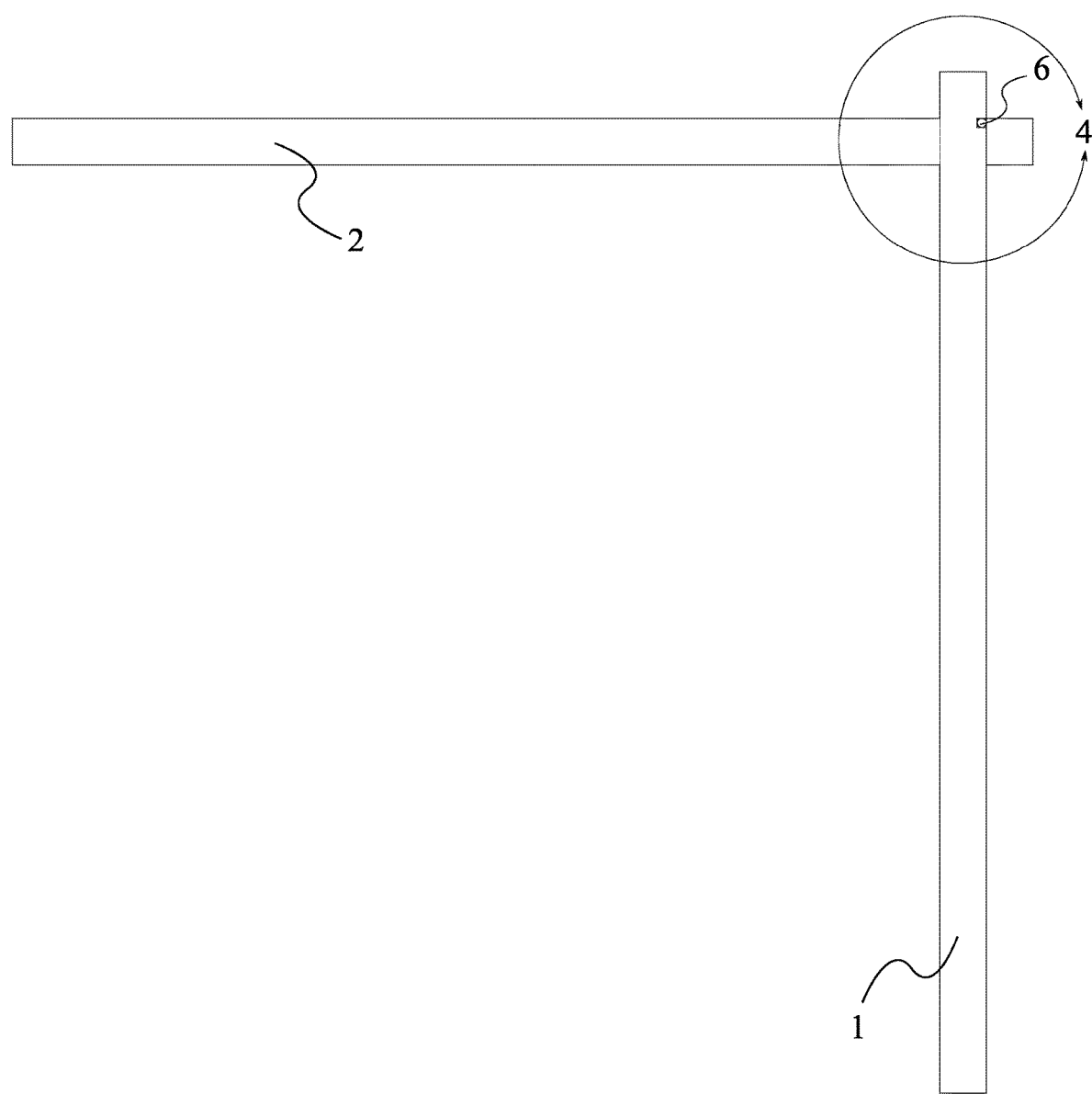
FIG. 3 is a front elevational view of the present invention.
Figure 4:
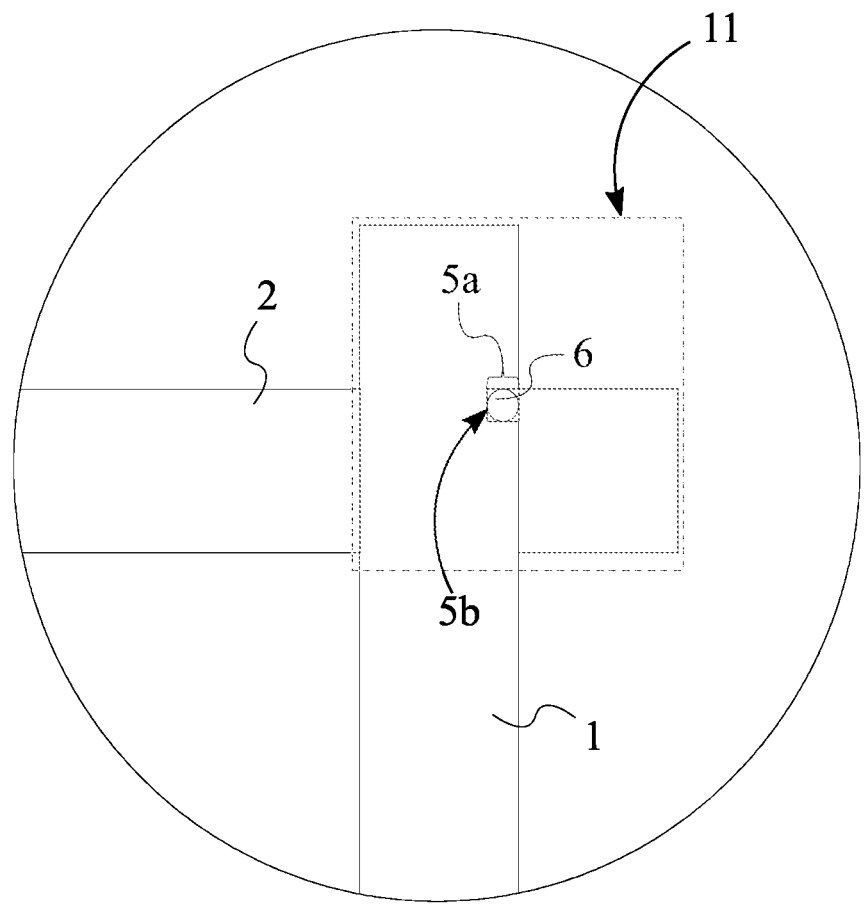
FIG. 4 is a detailed view of section 4 of FIG. 3.
Figure 5:
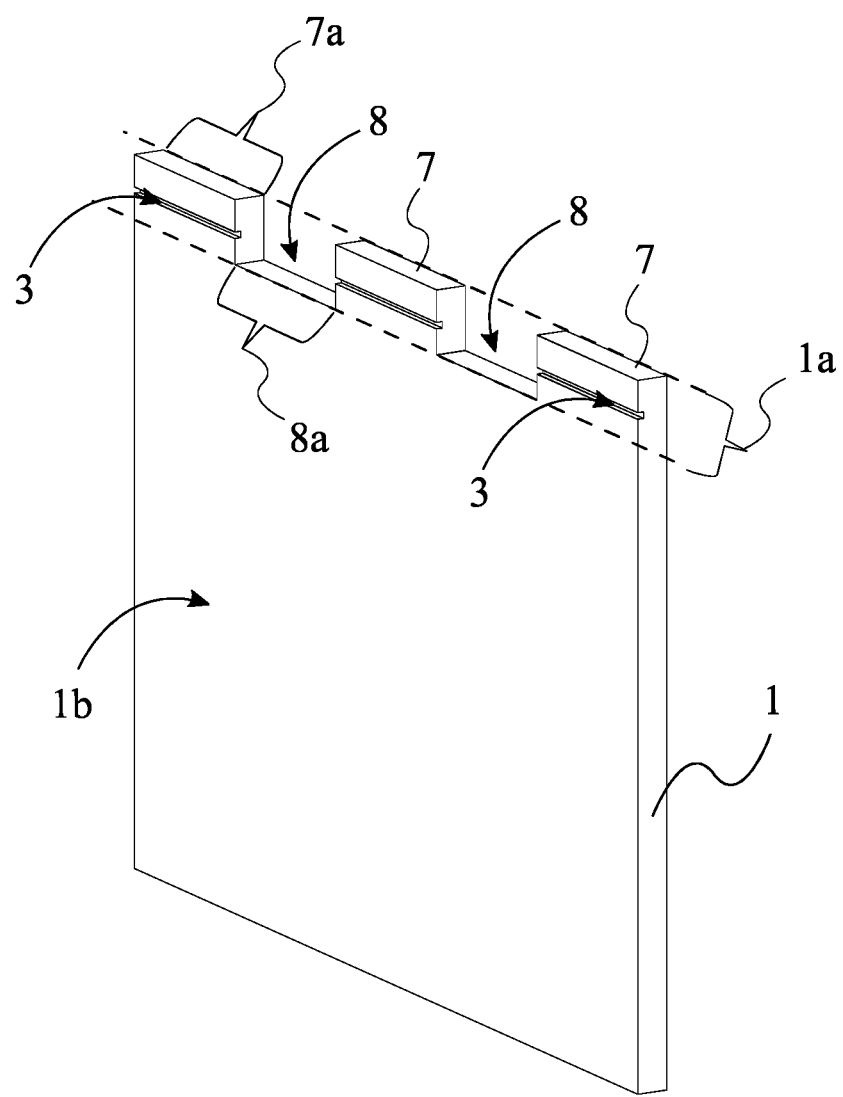
FIG. 5 is a top-front perspective view of the first panel.
Figure 6:
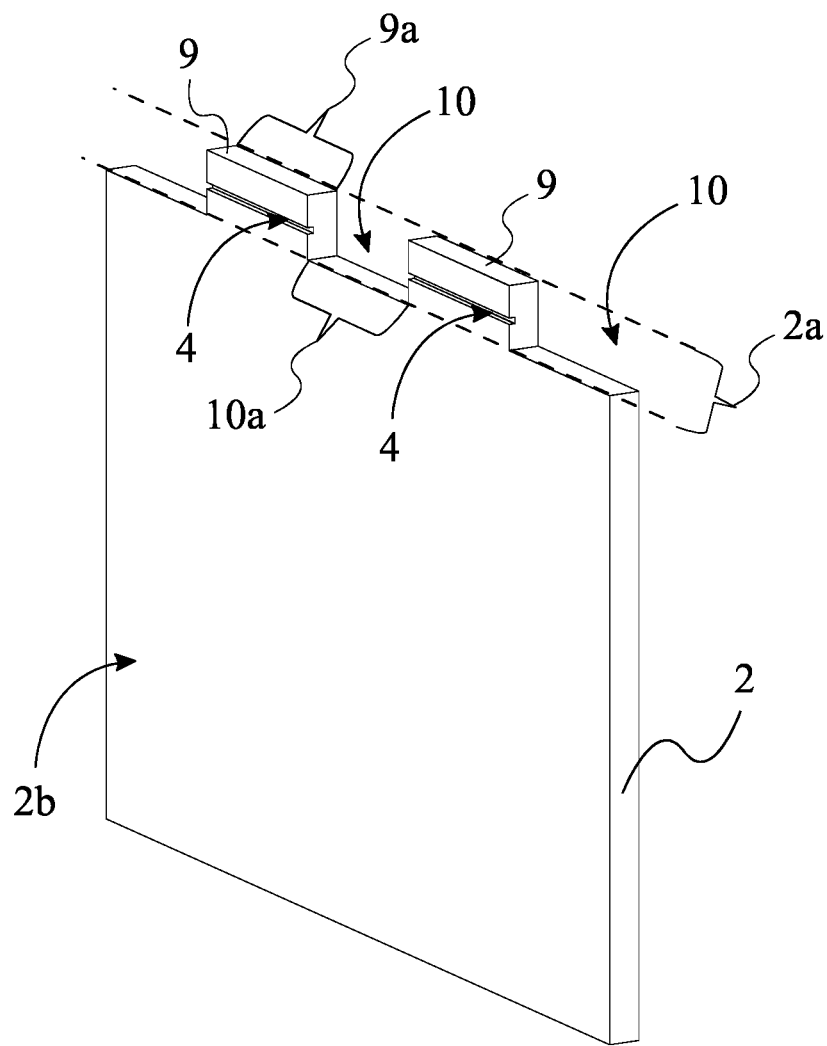
FIG. 6 is a top-front perspective view of the second panel.

The following description is in reference to FIG. 1 through FIG. 10. According to a preferred embodiment, the present invention comprises a first panel 1, a second panel 2, a plurality of first key slots 3, a plurality of second key slots 4, a channel 5, and a key 6. Preferably, the first panel 1 and the second panel 2 are rectangular pieces of a fairly stable material, such as wood, hard plastic etc. However, the first panel 1 and the second panel 2 may comprise any other material, shape, size, components, arrangement of components etc., as long as the intents of the present invention are not altered. Examples of such shapes include but are not limited to a plate, an object, a structure, rolled sheet etc. As seen in FIG. 5, the first panel 1 comprises a plurality of first gaps 7 and a plurality of first fingers 8, wherein the plurality of first gaps 7 and the plurality of first fingers 8 are positioned along a first edge region 1a of the first panel 1. In other words, the first panel 1 is a rectangular panel with a linear arrangement of fingers and gaps along the top edge of the plate. More specifically, the first edge region 1a comprises a linear pulse of rectangular boxes that are even in height and length. Furthermore, each the plurality of first gaps 7 and each the plurality of first fingers 8 are rectilinear and being positioned alternatingly along the first edge region 1a, as seen in FIG. 5. Similarly, according to the preferred embodiment, the second panel 2 comprises a plurality of second gaps 9 and a plurality of second fingers 10, wherein the plurality of second gaps 9 and the plurality of second fingers 10 is positioned along a second edge region 2a of the second panel 2. As seen in FIG. 6, each the plurality of second gaps 9 and each the plurality of second fingers 10 are rectilinear and being positioned alternatingly along the second edge region 2a.

Figure 7:
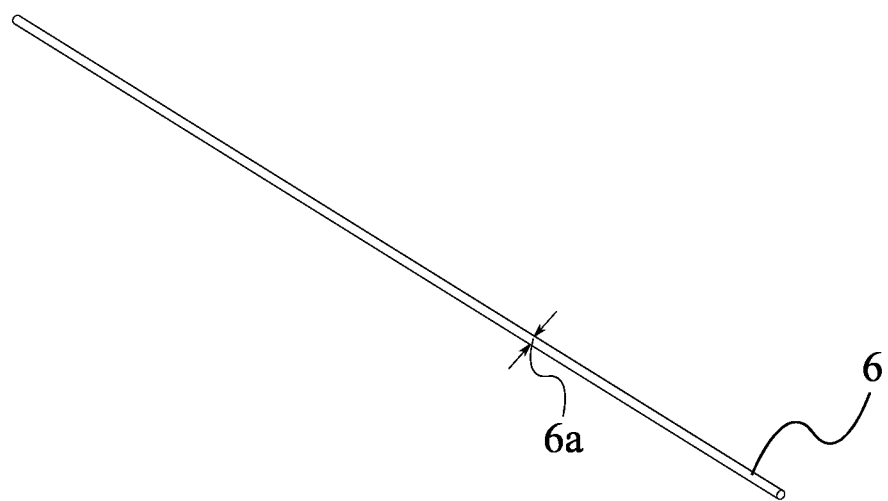
FIG. 7 is a top-front perspective view of the fastening key.

In the preferred embodiment, slots and the key are utilized as a fastening mechanism to interlock the panels. Accordingly, the fastening key or key 6 is a mechanism for jointly attaching the first panel 1 and the second panel 2 together. As seen in FIG. 7, the key 6 is an elongated cylindrical rod. Preferably, the length of the key 6 takes the length of the channel 5 created by the first panel 1 and the second panel 2. However, the key 6 may take many cylindrical forms such as a rod, wire, cable, monofilament, cord, tube, etc., as well as any other cross-sectional shape, that does not alter the intents of the present invention.

Figure 2:
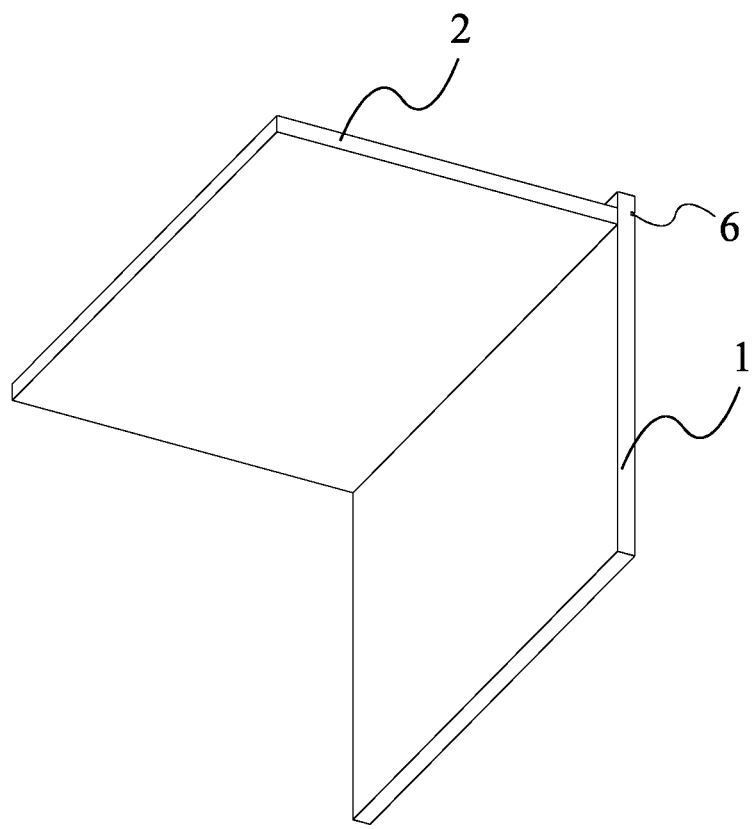
FIG. 2 is a bottom-front-right perspective view of the present invention.

In the preferred embodiment, the plurality of first key slots 3 laterally traverses into the plurality of first fingers 7, and the plurality of second key slots 4 laterally traverses into the plurality of second fingers 9. As seen in FIG. 1 through FIG. 12, the plurality of first key slots 3 and the plurality of second slots 4 may comprise various depths and positioning with respect to the first edge region 1a and the second edge region 2a respectively. Thus, in order to accomplish interlocking between the first panel 1 and the second panel 2, the channel 5 is delineated by the plurality of first key slots 3 and the plurality of second key slots 4. The formation of the channel 5 is fulfilled when the plurality of first key slots 3 aligns with the plurality of second key slots 4, wherein the first edge region 1a is positioned normally to the second edge region 2a. In other words, the channel 5 extends across the first panel 1 and the second panel 2, when the plurality of first key slots 3 intersects the plurality of second key slots 4. This is so that, the key 6 may be inserted within the channel 5, thereby interlocking the first panel 1 to the second panel 2. Preferably, the key is positioned recessed below a first end 1b of the first panel and below a second end 2b of the second panel. The first end 1b constitutes an upper surface of the first panel 1 and the second end 2b constitutes an upper surface of the second panel 2. Thus, according to the preferred embodiment, the key 6 is operatively integrated in between the first panel 1 and the second panel 2, wherein operating the key 6 interlocks the first panel 1 to the second panel 2 along an interlocking region 11. As seen in FIG. 4, the interlocking region 11 is the region formed when the first edge region 1a intersects with the second edge region 2a normally to create the channel 5. To accomplish interlocking and fastening of the key 6 within the channel 5, a width of the channel 5 must be equal to or slightly greater than a width of the key 6, thereby enabling the key 6 to fit within the channel 5 in a snug fashion. In other words, the first width 5a of the channel 5 is equal to or slightly greater than a diameter 6a of the key 6. Additionally, according to the present invention, during interlocking, the key 6 is positioned completely recessed within the channel 5, wherein the key is pressed against a first surface 5a of the channel 5. In the preferred embodiment, the first surface 5a constitutes a bottom surface of the channel 5. In other words, the bottoms of the slots form parts of a wall of the channel 5. Preferably, the bottom of the slot is ½ the width of the slot below the center axis of the channel 5. This enables a smooth joint and an aesthetically appealing concealed interconnection between the first panel 1 and the second panel 2.

In order to accomplish interconnection of the first edge region 1a and the second edge region 2a and thus enable 90 degrees interlocking between the first panel 1 and the second panel 2, the fingers and the gaps must be evenly spaced apart. To that end, each of the plurality of first gaps 8 comprises a first width 8a, each of the plurality of second fingers 9 comprises a second width 9a, each of the plurality of first fingers 8 comprises a third width 8a, and each of the plurality of second gaps 10 comprises a fourth width 10a. Accordingly, the first width 8a is equal to the second width 9a, and the third width 8a is equal to the fourth width 10a. This is so that the plurality of first fingers 8 may be positioned within the plurality of second gaps 10 and the plurality of second fingers 9 may be positioned within the plurality of first gaps 8 during the interlocking phase. In other words, each of the plurality of first fingers 7 is positioned within a second corresponding gap 10b, wherein the second corresponding gap 10b is from the plurality of second gaps 10, and each of the plurality of second fingers 9 is positioned within a first corresponding gap 8b, wherein the first corresponding gap 8b is from the plurality of first gaps 8. Further, in order to enable formation of the channel 5 for the interlocking process, a first transversal cross section 3a of the plurality of first key slots 3 is identical to a second transversal cross section 4a of the plurality of second key slots 4. Preferably, as seen in FIG. 5 and FIG. 6, the first transversal cross section 3a and the second transversal cross section 4a are rectangular. However, the plurality of first key slots 3 and the plurality of second key slots 4 may comprise any other shape, size, orientation etc. that are known to one of ordinary skill in the art, as long as the intents of the present invention are not altered.

Thus, according to the preferred embodiment of the present invention, wherein the first panel 1 is interlocked to the second panel 2, the plurality of first key slots 3 is positioned symmetrically rectilinear to the plurality of second key slots 4. This is so that the plurality of first key slots 3 may be linearly aligned with the plurality of second key slots 4 to delineate a single and long channel across the interlocking region 11 of the first panel 1 and the second panel 2. Accordingly, a transverse cross section of the channel 5 is a square in the preferred embodiment. However, the channel 5 may comprise any other cross section, as long as the objectives of the present invention are fulfilled.

Figure 1:
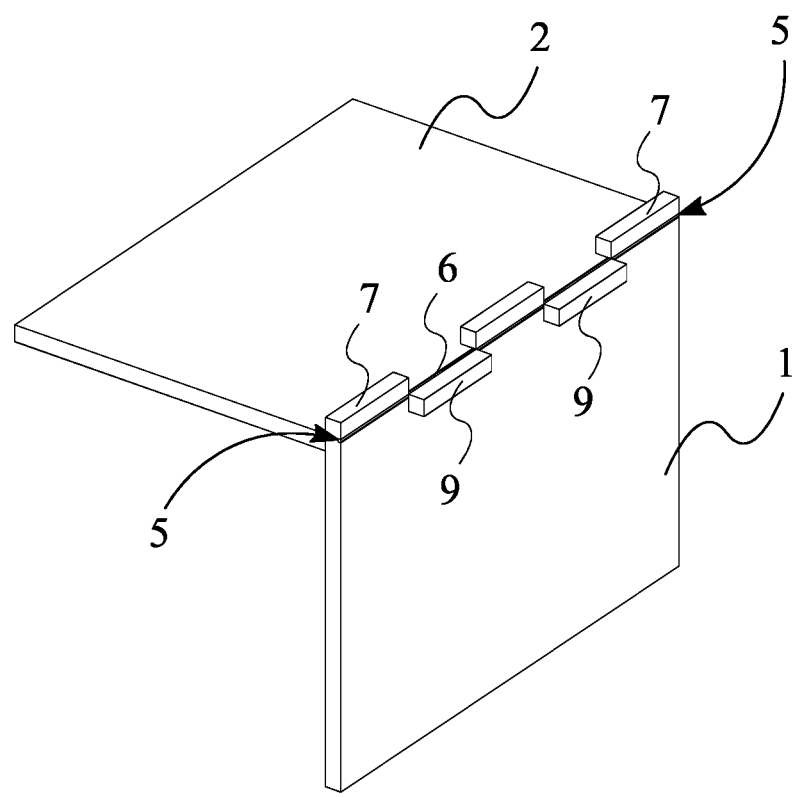
FIG. 1 is a top-front-left perspective view of the present invention.

A summarized description on the working of the present invention follows. As seen in FIG. 1 through FIG. 3, the first edge region 1a is positioned normal to the second edge region 2a and the key 6 is threaded through the plurality of first key slots 3 and the plurality of second key slots 4. More specifically, the first panel 1 and the second panel 2 are to align with their respective interlocking edges together at ninety degrees. When the present invention is configured and assembled correctly, the ends of the first panel 1 and the second panel 2 extend past the outer surface of the adjoining panel by a certain amount such as the panel's thickness, as can be seen by FIG. 1. When the first panel 1 and the second panel 2 are joined correctly, the slot of the first panel 1 will align with the slot of the second panel 2 forming the channel 5 with a square cross-section. To lock in the positions of the first panel 1 and the second panel 2, the fastening key 6 is to be inserted through the channel 5 with a square cross-section on the side of the interlocking region 11 created by the first panel 1 and the second panel 2. The fastening key 6 will be inserted and pushed to be fully encapsulated and recessed within the first panel 1 and the second panel 2. Once the key 6 is secured within the channel 5 created by the first panel 1 and the second panel 2, the first panel 1 and the second panel 2 are locked together creating a basic joint between the two panels as shown in FIG. 1 through 3.

Figure 10:
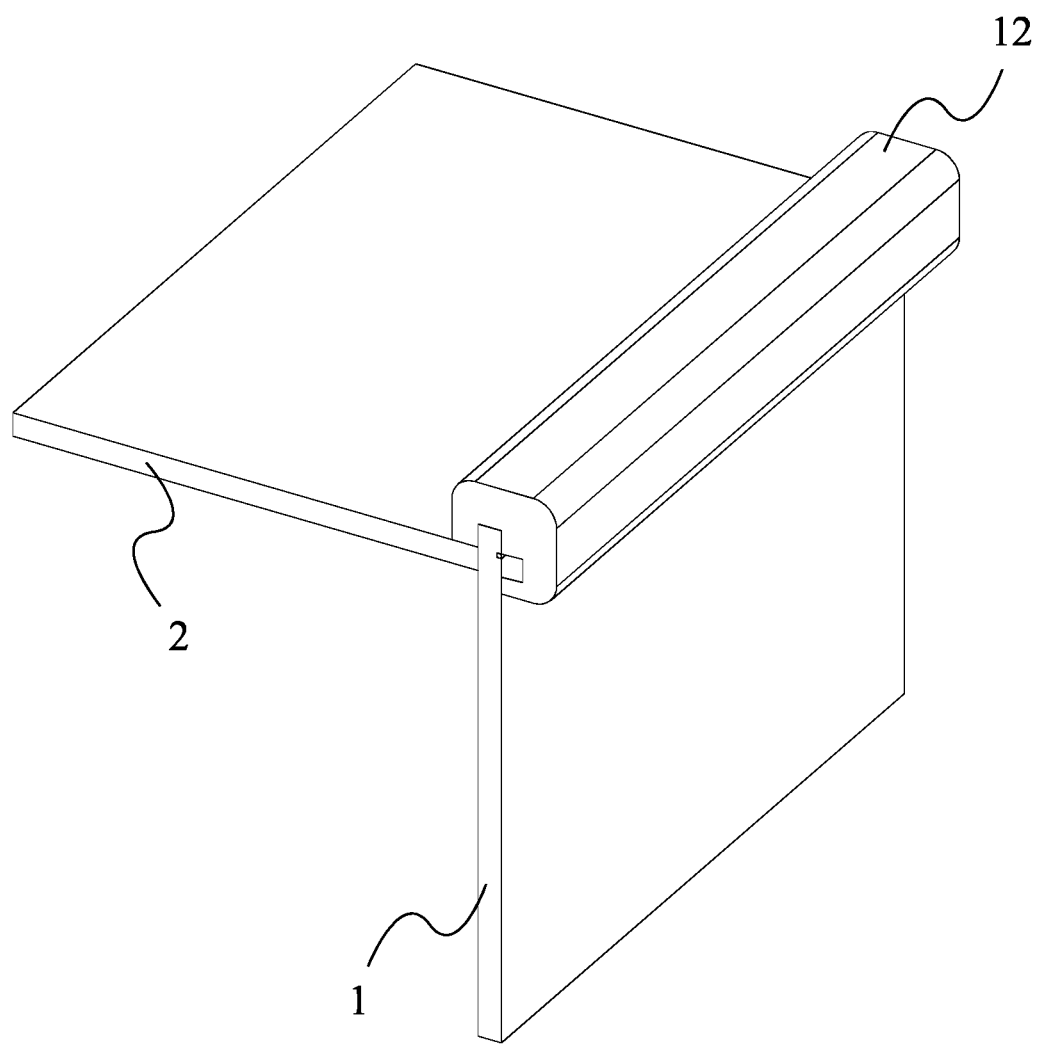
FIG. 10 is a top-front-left perspective view of the present invention with a joint cover.

According to the present invention, the plurality of first slots 3 and the plurality of second slots 4 may be positioned anywhere around the interlocking region 11 and may comprise different depths. A typical location for the key slots is where the channel 5 formed by their intersection is centered at the middle of the panel's thickness, as seen in FIG. 10. However, other locations are possible within limits.

Figure 8:
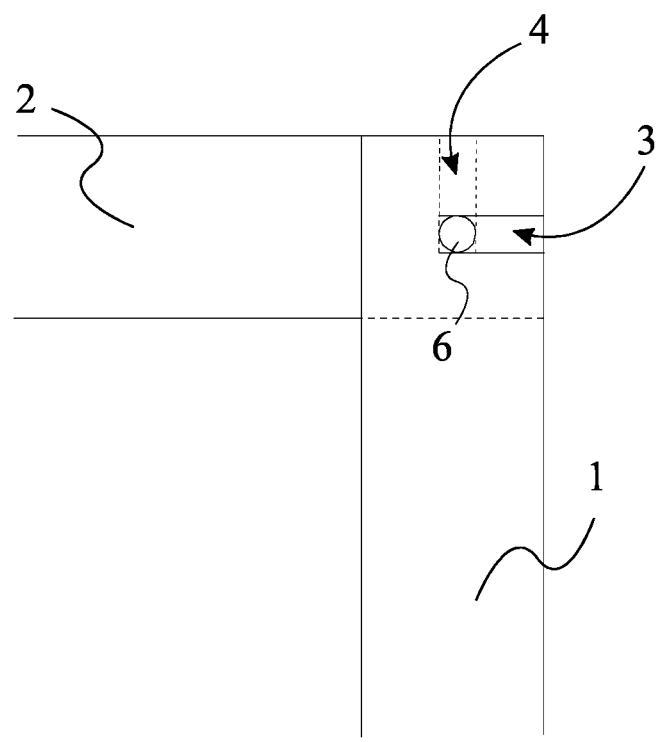
FIG. 8 is a detailed front elevational view of the present invention, wherein the channel is formed centrally along the interlocking region.

In reference to FIG. 8, the channel 5 is positioned centrally along the interlocking region 11 between the first panel 1 and the second panel 2. This positioning of the channel 5 is much preferred as it reduces stress points within the interlocking region 11.

Figure 9:
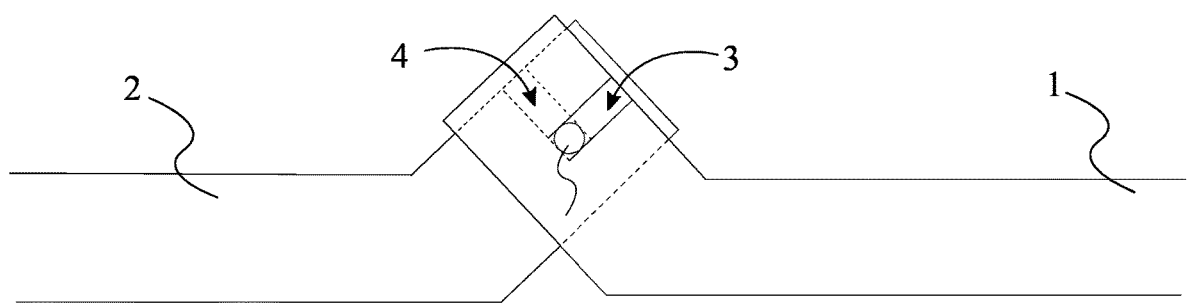
FIG. 9 is a detailed front elevational view of the present invention, wherein the panels are flexible.

As seen in FIG. 9, the first panel 1 and the second panel 2 may be flexible. In such cases, only the interlocking region 11 may be sturdy enough or have the dimensions to enable the objectives of the present invention. In other words, while the panel edges that form the joint must be uniformly rectilinear and meet at right angles at the joint itself, beyond the joint they can assume any shape and bend to any angle, so that parts joined by the joint do not have to be panel-shaped or perpendicular to each other overall.

In an alternate embodiment, the key 6 does not have to be a single continuous object but may be composed of segments. Segments of the key 6 that are equal in length to the width of the fingers may be inserted into the key slot from the side of the joint and then slid into position in the channel 5. A single long key as seen in FIG. 7, would normally be inserted from the end of the joint. An advantage of using segmented keys is the ability to form the assembly of long joints and the continuous assembly of joints. For example, long straight joints can be continuously formed using rolls of panel material that unroll as their edges are interlocked and the key segments are inserted.

In reference to FIG. 1 through FIG. 3, terminal edges of the plurality of first fingers 7 extend beyond the plurality of second gaps 10, and terminal edges of the plurality of second fingers 9 extend beyond the plurality of first gaps 8. In other words, the plurality of fingers on both the panels extends past the outer surface of the adjoining piece. However, as seen in FIG. 8, the finger ends may be flush with the outer surface of the adjoining piece. In other words, terminal edges of the plurality of first fingers 7 are positioned flush along terminal edges of the plurality of second gaps 10, and terminal edges of the plurality of second fingers 9 is positioned flush along terminal edges of the plurality of first gaps 8.

In reference to FIG. 10, the present invention comprises a joint cover 12. The joint cover 12 is an accessory to the present invention. The joint cover 12 provides a smooth cover over the joint. The joint cover 12 is a protective shield of the joint which enhances the stability and sturdiness of the connection between the first panel 1 and the second panel 2. Accordingly, the joint cover 12 is mounted around the interlocking region 11 between the first panel 1 and the second panel 2. Furthermore, the joint cover 12 is retained into position with the first panel 1 and the second panel 2 by frictional fitting or mechanical pins. As seen in FIG. 10, the joint cover 12 is retained by terminal edges of the plurality of first fingers 7 and terminal edges of the plurality of second fingers 9. For the attachment of the joint cover 12, the joint cover 12 is simply slid into place with aligning the interlocking edges of the first panel 1 and the second panel 2 into the section openings of the side of the joint cover 12. In addition, the joint cover 12 is a decorative piece which allow for any aesthetical design by the user. In the preferred embodiment, the joint cover 12 is made of pliable material to be mounted. However, the joint cover 12 may comprise any shape, form, components, and arrangement of components, as long as the objectives of the present invention are not altered.

A preferred method of operation of the present invention follows. For a user to connect the first panel 1 and the second panel 2 together, the user will begin by configuring and orienting the first panel 1 and the second panel 2 into the correct position. Using the first edge region 1a of the first panel 1, the user will align the aforementioned edge with respect to the second edge region 2a of the second panel 2. The interlocking edge of the first panel 1 will fill in the gapped spaces of the interlocking edge of the second panel 2. Likewise, the interlocking edge of the second panel 2 will fill the gapped spaces of the interlocking edge of the first panel 1. The angle created between the first panel 1 and the second panel 2 measures ninety degrees. When correctly positioned, the slot of the first panel 1 aligns with the slot of the second panel 2. This alignment will create the channel 5 with a square cross-section for the fastening key to be inserted. The user is to insert the fastening key into the slot through the exposed edges of the first panel and the second panel until the fastening key is completely secured throughout the length of both panels. Once the fastening key is correctly placed, the first panel 1 and the second panel 2 are secured together by means of the key 6. The fastening key will retain the interlocking mechanism of the first panel 1 and the second panel 2. In addition, the fastening key is completely recessed and embedded within the first panel 1 and the second panel 2. The recession of the fastening key simplifies the shape and minimizes the size of the joint.

Note that the present invention may be applied to tubular structures as they can be made by curving one or more lengths of panel until the edges to be joined meet. Furthermore, it is important to know that the smaller the fastening key and slot, the more strength there is in the joint due to the bulk of the panel material at stress points. Additionally, disconnection and detachment of the first panel 1 and the second panel 2 is achieved by removing the key 6. To remove the key 6, the user will simply need to eject or remove the key 6 from the exposed accessible end of the first panel 1 and the second panel 2. Furthermore, sufficiently pliant panel and/or key material would allow the fastening key to be introduced or removed from the side of the joint rather than strictly from the end.

Although the invention has been explained in relation to its preferred embodiment, it is to be understood that many other possible modifications and variations can be made without departing from the spirit and scope of the invention as hereinafter claimed.

What is claimed is:

1. A recessed-key panel interlocking device comprising:
a planar first panel comprising opposing inner and outer surfaces, and a plurality of alternating first gaps and first fingers disposed along a first side edge of the first panel, the first gaps comprising open grooves recessed into the first side edge extending through the inner and outer surfaces and defining the first fingers therebetween;
a plurality of aligned first key slots formed in the outer surfaces of the plurality of first fingers, the first key slots laterally traversing the first fingers and longitudinally extending parallel to the first side edge;
a planar second panel comprising opposing inner and outer surfaces, and a plurality of alternating second gaps and second fingers disposed along a second side edge of the second panel, the second gaps comprising open grooves recessed into the second side edge extending through the inner and outer surfaces and defining the second fingers therebetween;
a plurality of aligned second key slots formed in the outer surfaces of the plurality of second fingers, the second key slots laterally traversing the second fingers and longitudinally extending parallel to the second side edge;
wherein the first side edge of the first panel is interlocked with the second side edge of the second panel such that each of the first fingers is positioned within a corresponding one of the second gaps and each of the second fingers is positioned within a corresponding one of the first gaps, wherein the inner surface of each first finger abuts a bottom surface of the corresponding second gap and the inner surface of each second finger abuts a bottom surface of the corresponding first gap, and wherein terminal edges of the first fingers extend beyond the outer surface of the second panel and terminal edges of the second fingers extend beyond the outer surface of the first panel;

wherein the first panel is interlocked with the second panel such that the outer surface of the first panel is perpendicular to the outer surface of the second panel, and the plurality of first key slots and the plurality of second key slots are linearly aligned to form a channel having a square cross-section, the channel longitudinally extending parallel to and along the entire length of the first and second side edges of the panels;

an elongated cylindrical key threaded through the channel formed by the first key slots and the second key slots, the key being pressed against a surface of each of the first and second key slots to interlock the first panel to the second panel along an interlocking region of the panels; and an elongated joint cover mounted around the interlocking region of the first and second panels, the joint cover comprising a pair perpendicular longitudinally-extending channels for slidably receiving and matingly engaging the terminal edges of the first fingers and the second fingers, the joint cover engaging the outer surfaces of the first and second panels and extending along the entire length of the first and second side edges of the panels.

2. The recessed-key panel interlocking device of claim 1, wherein:

the plurality of first key slots are positioned symmetrically rectilinear to the plurality of second key slots; and a width of the channel is equal to a diameter of the key.

3. The recessed-key panel interlocking device of claim 1, wherein:

each of the plurality of first gaps comprises a first width;

each of the plurality of second fingers comprises a second width;

each of the plurality of first fingers comprises a third width;

each of the plurality of second gaps comprises a fourth width;

the first width is equal to the second width; and the third width is equal to the fourth width.

4. The recessed-key panel interlocking device of claim 1, wherein a first transversal cross section of the plurality of first key slots is identical to a second transversal cross section of the plurality of second key slots.

5. The recessed-key panel interlocking device of claim 1, wherein the channel is positioned centrally along the interlocking region between the first panel and the second panel.

6. The recessed-key panel interlocking device of claim 1, wherein the first panel and the second panel are flexible.

7. The recessed-key interlocking device of claim 1, wherein the plurality of first key slots and the plurality of second key slots are rectangular.

* * * * *